United States Patent
Kanno

(10) Patent No.: US 12,345,928 B2
(45) Date of Patent: Jul. 1, 2025

(54) END PART STRUCTURE FOR OPTICAL CONNECTORS

(71) Applicant: Fujikura Ltd., Tokyo (JP)

(72) Inventor: Shuhei Kanno, Sakura (JP)

(73) Assignee: Fujikura Ltd., Tokyo (JP)

(*) Notice: Subject to any disclaimer, the term of this patent is extended or adjusted under 35 U.S.C. 154(b) by 122 days.

(21) Appl. No.: 18/254,604

(22) PCT Filed: Jun. 23, 2021

(86) PCT No.: PCT/JP2021/023762
§ 371 (c)(1),
(2) Date: May 26, 2023

(87) PCT Pub. No.: WO2022/219828
PCT Pub. Date: Oct. 20, 2022

(65) Prior Publication Data
US 2024/0019644 A1     Jan. 18, 2024

(30) Foreign Application Priority Data
Apr. 14, 2021   (JP) ................. 2021-068104

(51) Int. Cl.
G02B 6/38          (2006.01)
(52) U.S. Cl.
CPC ......... G02B 6/3893 (2013.01); G02B 6/3894 (2013.01)
(58) Field of Classification Search
CPC ....... G02B 6/38; G02B 6/3893; G02B 6/3894
See application file for complete search history.

(56) References Cited

U.S. PATENT DOCUMENTS

| 5,480,203 A | * | 1/1996 | Favalora | ................. B25B 25/00 24/115 N |
| 6,055,350 A | * | 4/2000 | Brown | ..................... G02B 6/52 385/100 |
| 2010/0322568 A1 | | 12/2010 | Zimmel et al. | |

(Continued)

FOREIGN PATENT DOCUMENTS

| CN | 103454741 A | 12/2013 |
| CN | 111208610 A | 5/2020 |

(Continued)

OTHER PUBLICATIONS

International Search Report issued in corresponding International Application No. PCT/JP2021/023762 mailed Sep. 21, 2021 (3 pages).

*Primary Examiner* — Tina Wong
(74) *Attorney, Agent, or Firm* — Osha Bergman Watanabe & Burton LLP

(57) ABSTRACT

An end part structure for an optical connector includes a ferrule having a connection end face and a fiber hole into which an optical fiber is inserted up to the connection end face, a spring disposed at a rear side of the ferrule in a longitudinal direction of the fiber hole, a spring push that surrounds the optical fiber, a housing that accommodates the ferrule and the spring and to which the spring push is locked such that the ferrule is biased forward by the spring, a braided tube mounted on the spring push, and a fixing member that fixes the braided tube to the spring push. The spring is sandwiched between the spring push and the ferrule in the longitudinal direction.

8 Claims, 9 Drawing Sheets

(56) References Cited

U.S. PATENT DOCUMENTS

| | | | | |
|---|---|---|---|---|
| 2013/0315541 | A1* | 11/2013 | Nhep | G02B 6/3888 |
| | | | | 385/80 |
| 2015/0346435 | A1* | 12/2015 | Kato | G02B 6/3885 |
| | | | | 385/78 |
| 2018/0003903 | A1* | 1/2018 | Ko | G02B 6/3881 |
| 2018/0011262 | A1 | 1/2018 | Chabot et al. | |
| 2018/0217335 | A1* | 8/2018 | Leeson | G02B 6/3887 |
| 2018/0364421 | A1* | 12/2018 | Chang | G02B 6/3825 |
| 2019/0137700 | A1* | 5/2019 | Takano | G02B 6/3893 |
| 2020/0057204 | A1* | 2/2020 | Lee | G02B 6/3825 |
| 2021/0080656 | A1* | 3/2021 | Fujita | G02B 6/387 |

FOREIGN PATENT DOCUMENTS

| | | |
|---|---|---|
| JP | H05-11143 A | 1/1993 |
| JP | 2015-232962 A | 12/2015 |
| JP | 2016-164597 A | 9/2016 |
| JP | 2016-218344 A | 12/2016 |
| JP | 2020-013010 A | 1/2020 |
| WO | 2018/195109 A1 | 10/2018 |
| WO | 2020/071124 A1 | 4/2020 |
| WO | 2021/124702 A1 | 6/2021 |

* cited by examiner

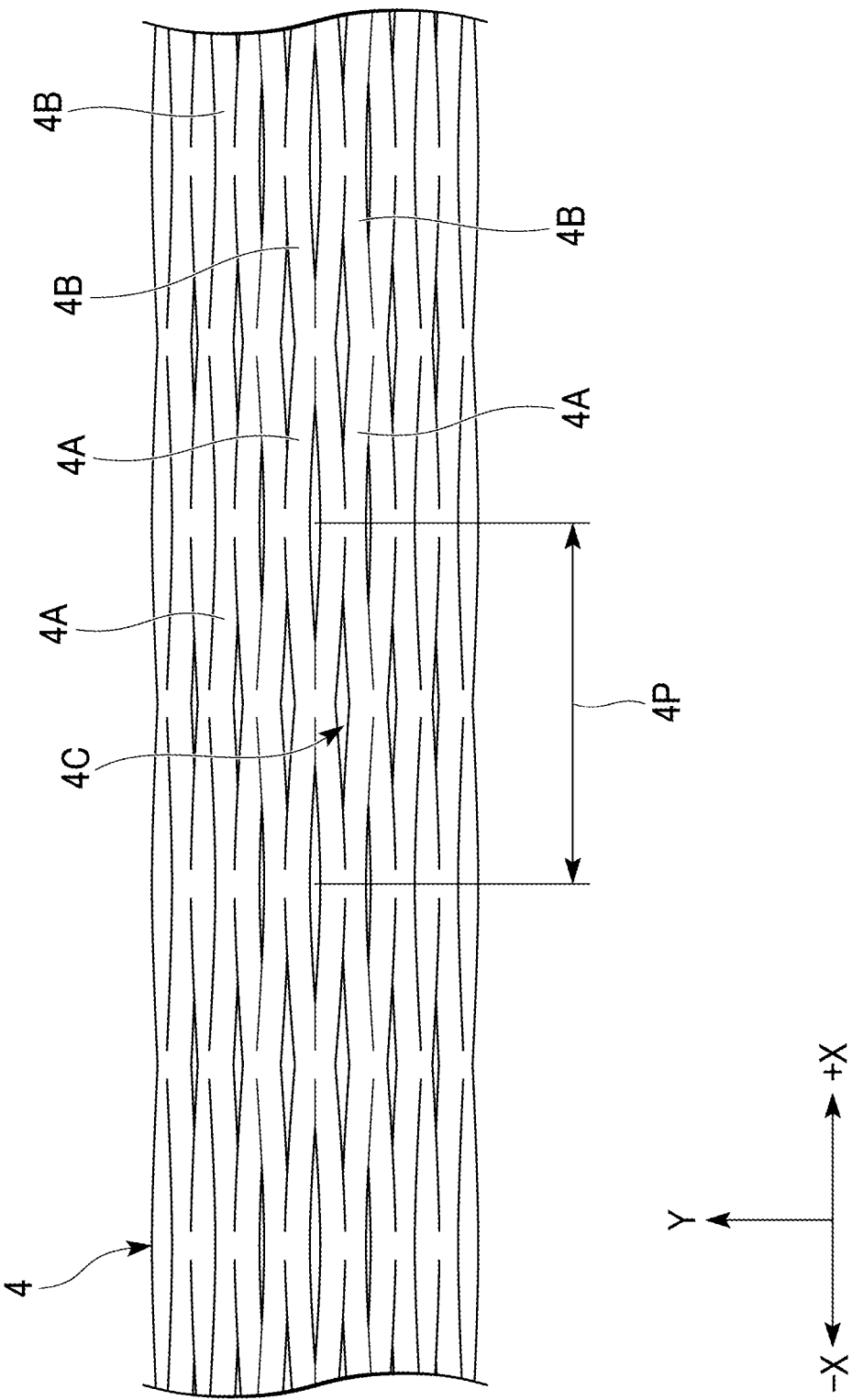

END PART STRUCTURE FOR OPTICAL CONNECTORS

BACKGROUND

Technical Field

The present invention relates to an end part structure for an optical connector.

Description of the Related Art

In a structure in which a tip of an optical fiber is inserted into and mounted on an optical connector, in order to protect the optical fiber extending from the optical connector, the optical fiber is inserted inside a protective tube. A rubber tube is often used as the protective tube.

Patent Document 1 discloses a structure in which an end portion of a tubular optical connector (connecting member) is inserted inside an end portion of a protective tube, so that the end portion of the protective tube is mounted on the end portion of the optical connector. Fixing of the end portion of the protective tube to the end portion of the optical connector is often performed using a fixing tube made of metal. More specifically, the protective tube is fixed by sandwiching the end portion of the protective tube between the end portion of the optical connector and the fixing tube in a radial direction.

Patent Document

Patent Document 1: Japanese Patent Publication No. 2016-218344

Here, a braided tube is sometimes used as a protective tube. The braided tube is configured by weaving flexibly deformable fibers (for example, resin fibers made of polyester or the like). Therefore, the braided tube has the property that when the braided tube is expanded and contracted in an axial direction thereof, the diameter dimension of the braided tube greatly changes compared to a rubber tube. For this reason, the braided tube has the advantage of being easily applicable to various optical fibers having different fiber diameters.

However, in a fixing method in which the braided tube is simply sandwiched between the fixing tube and the end portion of the optical connector, due to the properties of the braided tube where a diameter dimension easily changes, it is difficult to stably fix the braided tube.

SUMMARY

One or more embodiments provide an end part structure for an optical connector in which it is possible to stably fix a braided tube to an end portion of an optical connector.

An end part structure for an optical connector according to one or more embodiments includes: a ferrule having a connection end face and a fiber hole into which an optical fiber is inserted up to the connection end face; a spring disposed behind the ferrule, in a longitudinal direction of the fiber hole, where a side on which the connection end face is located is defined as a front side and an opposite side is defined as a rear side; a spring push that surrounds the optical fiber with the spring sandwiched between the spring push and the ferrule in the longitudinal direction; a housing that accommodates the ferrule and the spring inside, and to which the spring push is locked such that the ferrule is biased forward by the spring; a braided tube that is mounted on the spring push; and a fixing member that fixes the braided tube to the spring push, in which the spring push has a tube mounting part that is inserted inside the braided tube and is formed in a tubular shape extending in the longitudinal direction, the tube mounting part has a first straight tubular section in which an outer diameter dimension is constant in the longitudinal direction, and a tapered tubular section that is located behind the first straight tubular section in which outer diameter dimension becomes smaller toward the rear side, the fixing member is formed in a tubular shape such that the tube mounting part is inserted inside thereof from behind the tube mounting part, an end portion of the braided tube mounted on the tube mounting part is located inside the fixing member, the fixing member is locked to the tube mounting part in a state where the braided tube is sandwiched between an outer peripheral surface of the tapered tubular section and an inner peripheral surface of the fixing member in the longitudinal direction, and a length of the first straight tubular section is equal to or larger than a mesh pitch of the braided tube.

In the above end part structure for an optical connector, the length of the first straight tubular section may be equal to or larger than twice the mesh pitch.

In the above end part structure for an optical connector, the outer diameter dimension of the first straight tubular section may be larger than an inner diameter dimension of the braided tube.

In the above end part structure for an optical connector, the tube mounting part may have a second straight tubular section extending rearward from the tapered tubular section, an outer diameter dimension of the second straight tubular section may be constant in the longitudinal direction and be smaller than the outer diameter dimension of the first straight tubular section, and a gap may be formed between an outer peripheral surface of the second straight tubular section and the inner peripheral surface of the fixing member in a state where the fixing member is locked to the tube mounting part.

In the above end part structure for an optical connector, a gap may be formed between an outer peripheral surface of the first straight tubular section and the inner peripheral surface of the fixing member in a state where the fixing member is locked to the tube mounting part.

In the above end part structure for an optical connector, a first interval between the outer peripheral surface of the first straight tubular section and the inner peripheral surface of the fixing member in a radial direction may be less than or equal to a second interval between the outer peripheral surface of the second straight tubular section and the inner peripheral surface of the fixing member in the radial direction.

In the above end part structure for an optical connector, the fixing member may have an observation window penetrating the fixing member in a radial direction, and the observation window may be disposed at a position corresponding to an outer peripheral surface of the first straight tubular section in the longitudinal direction in a state where the fixing member is locked to the tube mounting part.

In the above end part structure for an optical connector, the tube mounting part may have a male screw tubular section provided in front of the first straight tubular section and having a male screw formed on an outer peripheral surface thereof, and a female screw engaging with the male screw may be formed on the inner peripheral surface of the fixing member.

According to one or more embodiments, it is possible to stably fix the braided tube to an end portion (tube mounting part) of the optical connector.

BRIEF DESCRIPTION OF THE DRAWINGS

FIG. 9 is an enlarged side view showing an example of the braided tube.

DESCRIPTION OF THE EMBODIMENTS

Hereinafter, embodiments is described with reference to FIGS. 1 to 9.

Figure 1:
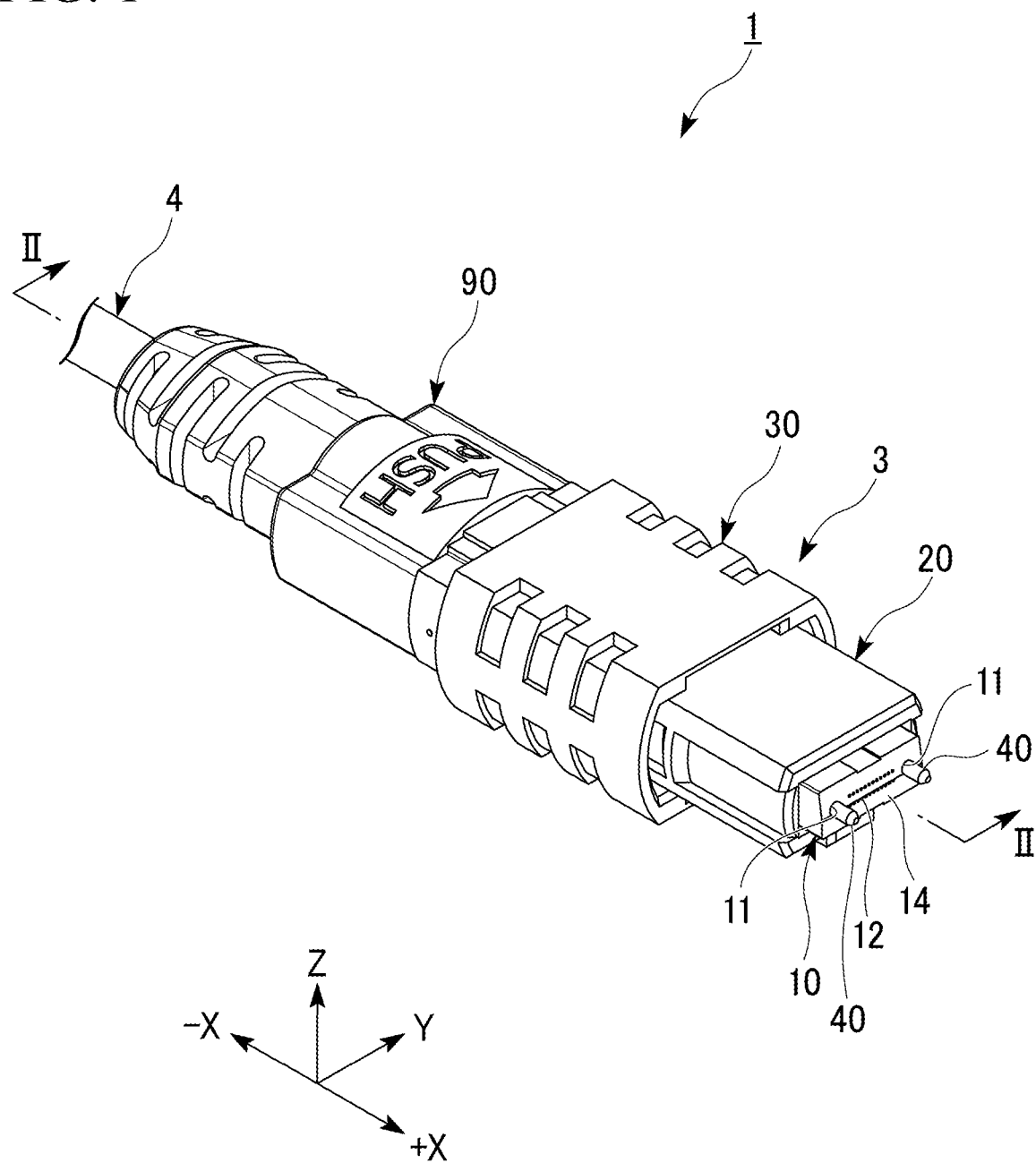
FIG. 1 is a perspective view showing an end part structure for an optical connector according to one or more embodiments.
Figure 2:
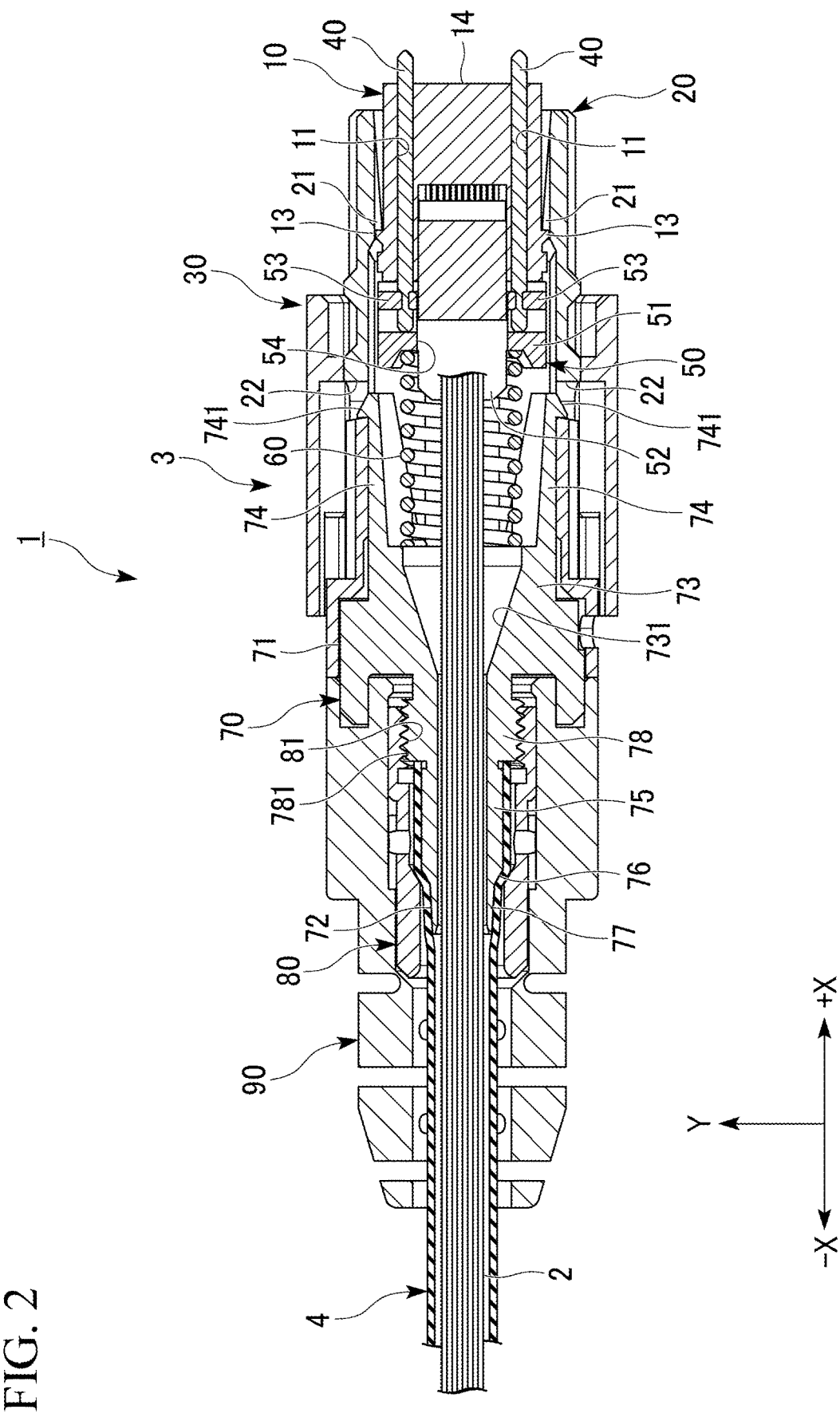
FIG. 2 is a cross-sectional view taken along line II-II of FIG. 1.
Figure 3:
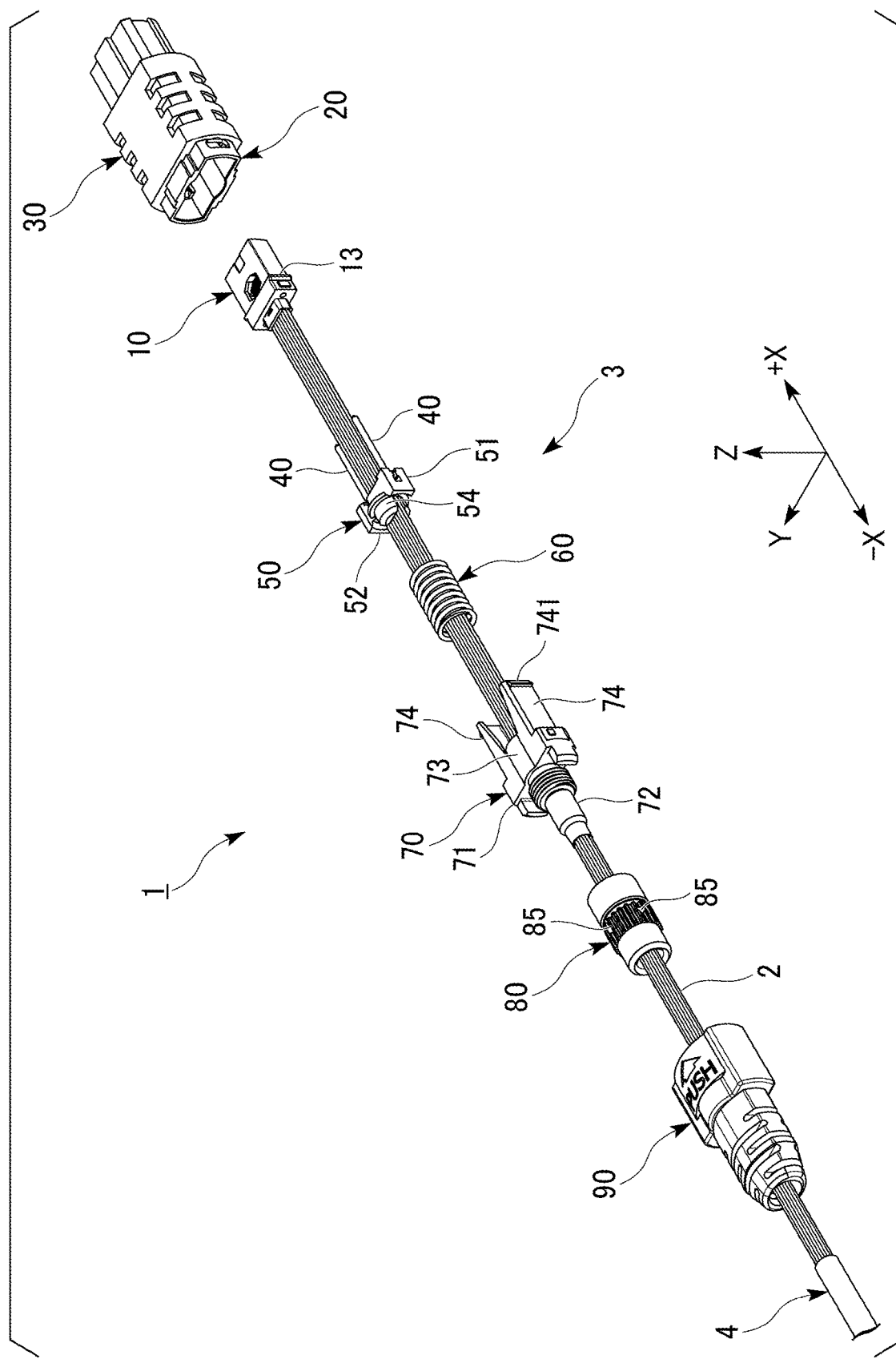
FIG. 3 is an exploded perspective view of the end part structure for an optical connector of FIG. 1.

As shown in FIGS. 1 to 3, an end part structure for an optical connector 1 of one or more embodiments includes a plurality of optical fibers 2, an optical connector 3, and a braided tube 4. The optical connector 3 includes a ferrule 10, a housing 20, a coupling 30, two guide pins 40, a pin clamp 50, a spring 60, a spring push 70, a fixing member 80, and a boot 90. The optical connector 3 of one or more embodiments is of a so-called MPO (Multi-fiber Push On) type.

As shown in FIGS. 2 and 3, the end portions of the plurality of optical fibers 2 are mounted on the optical connector 3. The plurality of optical fibers 2 extending from the optical connector 3 are protected by being inserted inside the braided tube 4. The plurality of optical fibers 2 may be connected to each other to form a ribbon cable, for example, or may be bundled by a binding material, for example.

The braided tube 4 is mounted on the spring push 70 which is described later. The braided tube 4 is shown in a state of being simplified in a simple tubular shape in FIGS. 1 to 3, and is omitted in FIGS. 4 to 8. The actual braided tube 4 is a tube made by weaving elastically flexibly deformable fibers 4A and 4B (typically resin fibers) into a mesh shape, as shown in FIG. 9. The braided tube 4 is highly stretchable. Therefore, it is possible to freely change the diameter dimension of the braided tube 4 in accordance with the size (diameter dimension) of the bundle of the plurality of optical fibers 2 which are inserted inside the braided tube 4.

Specifically, the braided tube 4 is composed of a plurality of first fibers 4A and a plurality of second fibers 4B. The plurality of first fibers 4A are each formed in a clockwise helical shape and are arranged at regular intervals in a longitudinal direction (an axial direction X; a right-left direction in FIG. 9) of the braided tube 4. On the other hand, the plurality of second fibers 4B are each formed in a counterclockwise helical shape and are arranged at regular intervals in the axial direction X. The first fiber 4A and the second fiber 4B are joined to each other at a portion where both intersect. In such a manner, the braided tube 4 has a mesh 4C having a rhombic shape and surrounded by two first fibers 4A and two second fibers 4B. The length of the mesh 4C in the axial direction X is changed by expanding or contracting the braided tube 4 in the axial direction X or by changing the diameter dimension of the braided tube 4.

In the following description, the interval between the joined portions of the first fiber 4A and the second fiber 4B arranged at an interval in the axial direction X (the length of the mesh 4C in the axial direction X) in a state where an external force does not act on the braided tube 4 is called a mesh pitch 4P.

As shown in FIGS. 1 and 2, the ferrule 10 is formed with two guide holes 11, a plurality of fiber holes 12, and two restricting projections 13. The guide holes 11 and the fiber holes 12 are open on a connection end face 14 of the ferrule 10. The guide pin 40 is inserted into each of the guide holes 11, and an end portion of the optical fiber 2 is inserted into each of the fiber holes 12. It is possible to appropriately change the number of fiber holes 12 formed in the ferrule 10, and the number for example, may only be one. That is, the number of optical fibers 2 that are mounted on the optical connector 3 may be one fiber or may be multiple fibers.

(Direction Definition)

In one or more embodiments, the longitudinal direction of each of the optical fiber 2, the guide holes 11, or the fiber holes 12 is called the axial direction X. The axial direction X coincides with the longitudinal direction of the braided tube 4. The direction in which the two guide holes 11 or the two guide pins 40 are arranged is called a right-left direction Y. The right-left direction Y is orthogonal to the axial direction X. The direction orthogonal to both the axial direction X and the right-left direction Y is called an up-down direction Z. Further, the side on which the connection end face 14 is located in the axial direction X is called a front side (+X side) or a tip side, and the opposite side is called a rear side (−X side) or a base end side.

Each of the guide holes 11 and the fiber holes 12 of the ferrule 10 penetrate the ferrule 10 in the axial direction X. Further, the restricting projections 13 of the ferrule 10 protrude outward from both ends of the ferrule 10 in the right-left direction Y.

The end face of the optical fiber 2 inserted into the fiber holes 12 is exposed on the connection end face 14 of the ferrule 10. The connection end face 14 may be inclined with respect to the up-down direction Z so as to face the rear side as it heads from the upper side towards the lower side, for example. The connection end face 14 having such an inclination can be formed, for example, by polishing the ferrule 10.

The ferrule 10 of one or more embodiments is formed in the shape of a laterally long rectangular parallelepiped of which a dimension in the up-down direction Z is smaller than the dimension in the right-left direction Y.

As shown in FIGS. 2 and 3, the housing 20 is formed in a tubular shape extending in the axial direction X. The housing 20 is open to both the front side and the rear side. The ferrule 10 is inserted into the housing 20 from the rear side. As shown in FIG. 2, in a state where the ferrule 10 is accommodated inside the housing 20, the restricting projection 13 of the ferrule 10 abuts against a retaining portion 21 formed inside the housing 20 from the rear side. That is, the restricting projection 13 of the ferrule 10 restrains the ferrule 10 from falling forward from the housing 20. A front end portion including the connection end face 14 of the ferrule 10 protrudes forward from an opening portion at the front end of the housing 20.

Two locking holes 22 are formed in the housing 20. The locking holes 22 are formed at both end portions of the housing 20 in the right-left direction Y. In FIG. 2, each of the locking holes 22 penetrates the housing 20 in the right-left direction Y. Each of the locking holes 22 may be, for example, a bottomed recess that does not penetrate the housing 20 and is recessed toward the outside in the right-left direction Y from the inner surface of the housing 20.

As shown in FIGS. 1 to 3, the coupling 30 is formed in a tubular shape extending in the axial direction X and surrounds the housing 20 from the outside. Although a detailed description is omitted, the coupling 30 is a member that is gripped and pulled backward by a user when pulling out the optical connector 3 from a connection object (such as an adapter).

A second spring (not shown) is provided between the housing 20 and the coupling 30 in the axial direction X. The second spring biases the coupling 30 forward and biases the housing 20 rearward. The second spring has a role of restoring the coupling 30 forward, which has moved rearward with respect to the housing 20.

As shown in FIGS. 2 and 3, the pin clamp 50 is disposed behind the ferrule 10 and holds the rear end portion of the guide pin 40 protruding rearward from the ferrule 10. The pin clamp 50 has a clamp main body 51 and a spring holding portion 52.

The clamp main body 51 includes two pin holding portions 53 arranged at an interval in the right-left direction Y. Each of the two pin holding portions 53 holds each of the rear end portions of the two guide pins 40. Each of the guide pins 40 held by the pin holding portions 53 extends forward of the clamp main body 51 in the axial direction X. Each of the guide pins 40 is inserted into the guide holes 11 from behind the ferrule for example, and protrudes forward from the connection end face 14 of the ferrule 10. The clamp main body 51 holding the two guide pins 40 comes into contact with the ferrule from the rear side, thereby preventing the two guide pins 40 from coming out forward of the ferrule 10. If the positional relationship between the base end portion (the end portion on the base end side) of the ferrule 10 and the clamp main body 51 is fixed and the pin holding portion 53 is made of an elastic material such as rubber or the like, it is also possible to insert the guide pin 40 into the ferrule 10 from the tip side (the connection end face 14 side) and to fit and fix the guide pin 40 to the pin holding portion 53.

The spring holding portion 52 protrudes rearward from the clamp main body 51. The spring holding portion 52 holds the front end portion of the spring 60 that is disposed behind the pin clamp 50. Specifically, the spring holding portion 52 is fitted inside the front end portion of the spring 60 having a tubular shape. In such a manner, the front end portion of the spring 60 is held by the pin clamp 50.

Further, an insertion hole 54 penetrating in the axial direction X is formed in the pin clamp 50. The insertion hole 54 is formed in both the clamp main body 51 and the spring holding portion 52 lined up in the axial direction X. The optical fiber 2 extending rearward from the ferrule 10 is inserted into the insertion hole 54.

The spring 60 is disposed behind the ferrule 10 or the pin clamp 50 and is elastically deformable in the axial direction X. Specifically, the spring 60 is a tubular coil spring that elastically expands and contracts in the axial direction X. The optical fiber 2 is inserted inside the spring 60 at the rear of the pin clamp 50. The spring 60 is accommodated inside the housing 20 together with the ferrule 10 and the pin clamp 50.

The spring push 70 sandwiches the spring 60 between itself and the pin clamp 50 in the axial direction X. The spring push 70 is configured so that it is possible to insert the optical fiber 2 inside. Further, the spring push 70 is locked to the housing 20. The spring push 70 has a spring push main body 71 and a tube mounting part 72.

The spring push main body 71 has a spring support portion 73 and two locking pieces 74.

The spring support portion 73 supports the spring 60 from the rear side. A through-hole 731 penetrating in the axial direction X is formed in the spring support portion 73. The through-hole 731 communicates with the inner side of the tubular tube mounting part 72 (described later) in the axial direction X. The optical fiber 2 extending rearward from the spring 60 is inserted inside the through-hole 731 of the spring push main body 71 and the tube mounting part 72.

Each of the two locking pieces 74 extends forward from the spring support portion 73. Specifically, the two locking pieces 74 extend forward from both the end portions in the right-left direction Y of the spring support portion 73. A locking projection 741 is formed at the front end of each of the locking pieces 74. Each locking projection 741 protrudes from the locking piece 74 to the outside of the spring push 70 in the right-left direction Y.

As shown in FIG. 2, each locking projection 741 is locked into the locking hole 22 of the housing 20. Specifically, the pin clamp 50 and the spring 60 are sandwiched between the spring support portion 73 and the ferrule 10 in the axial direction X. Further, the locking projection 741 is locked into the locking hole 22 of the housing 20 in a state where the locking piece 74 is inserted inside the housing 20 from the rear side. In such a state, the spring 60 is elastically compressed and deformed (elastically deformed), and the ferrule 10 is biased forward by the elastic force of the spring 60.

Figure 4:
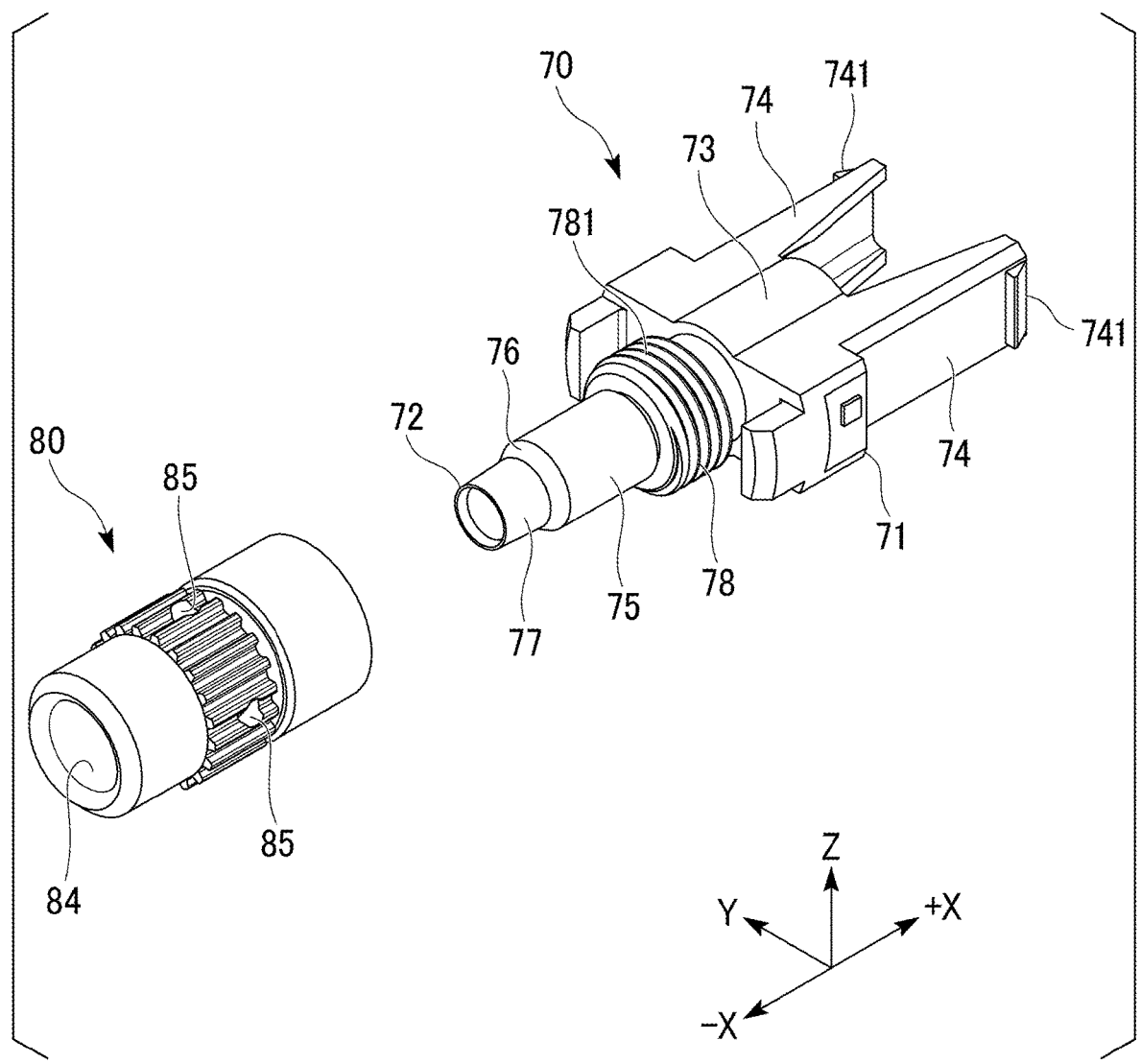
FIG. 4 is an enlarged perspective view showing a spring push and a fixing member of FIG. 3.
Figure 5:
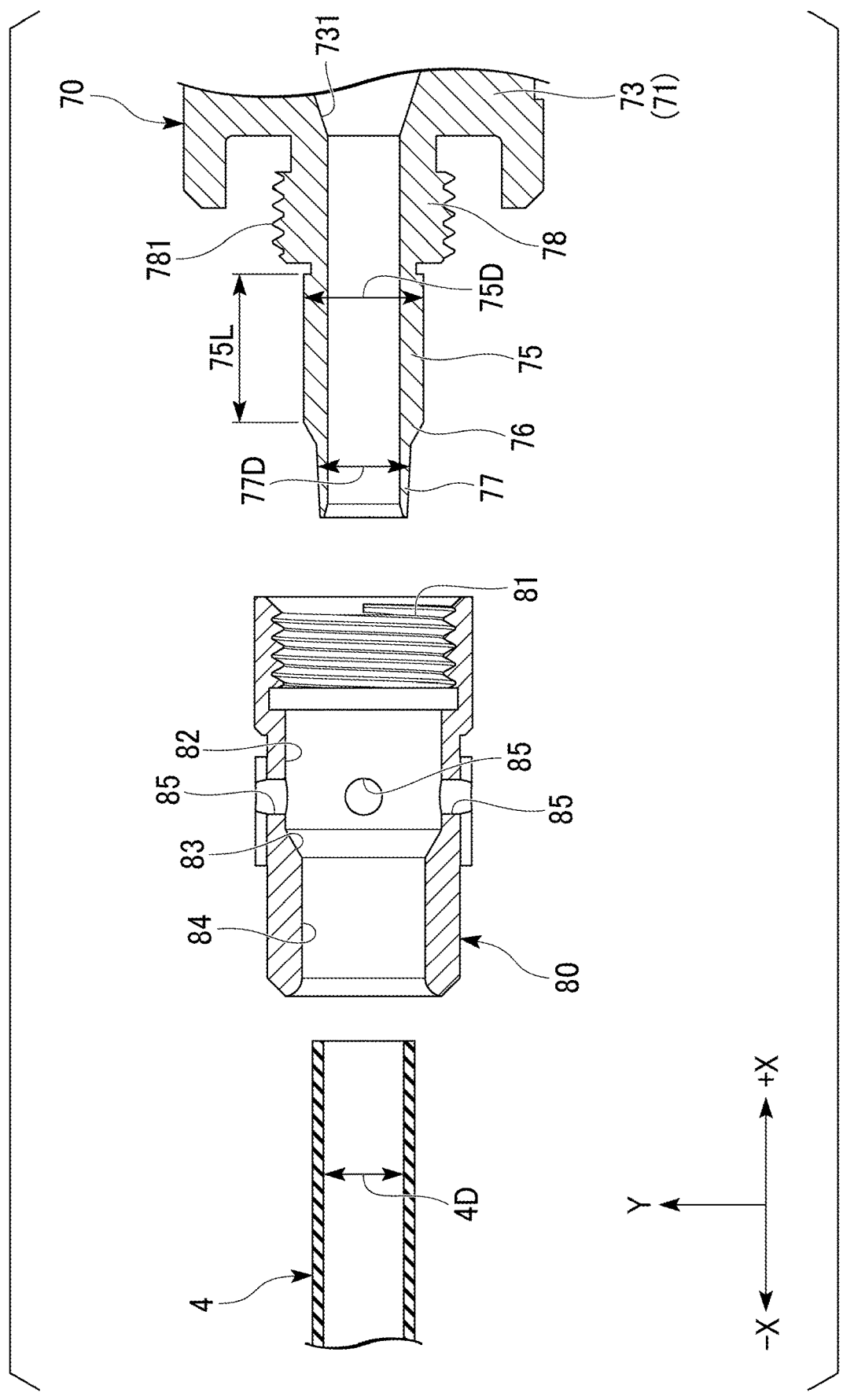
FIG. 5 is a cross-sectional view showing the spring push, the fixing member, and a braided tube of FIGS. 3 and 4.
Figure 7:
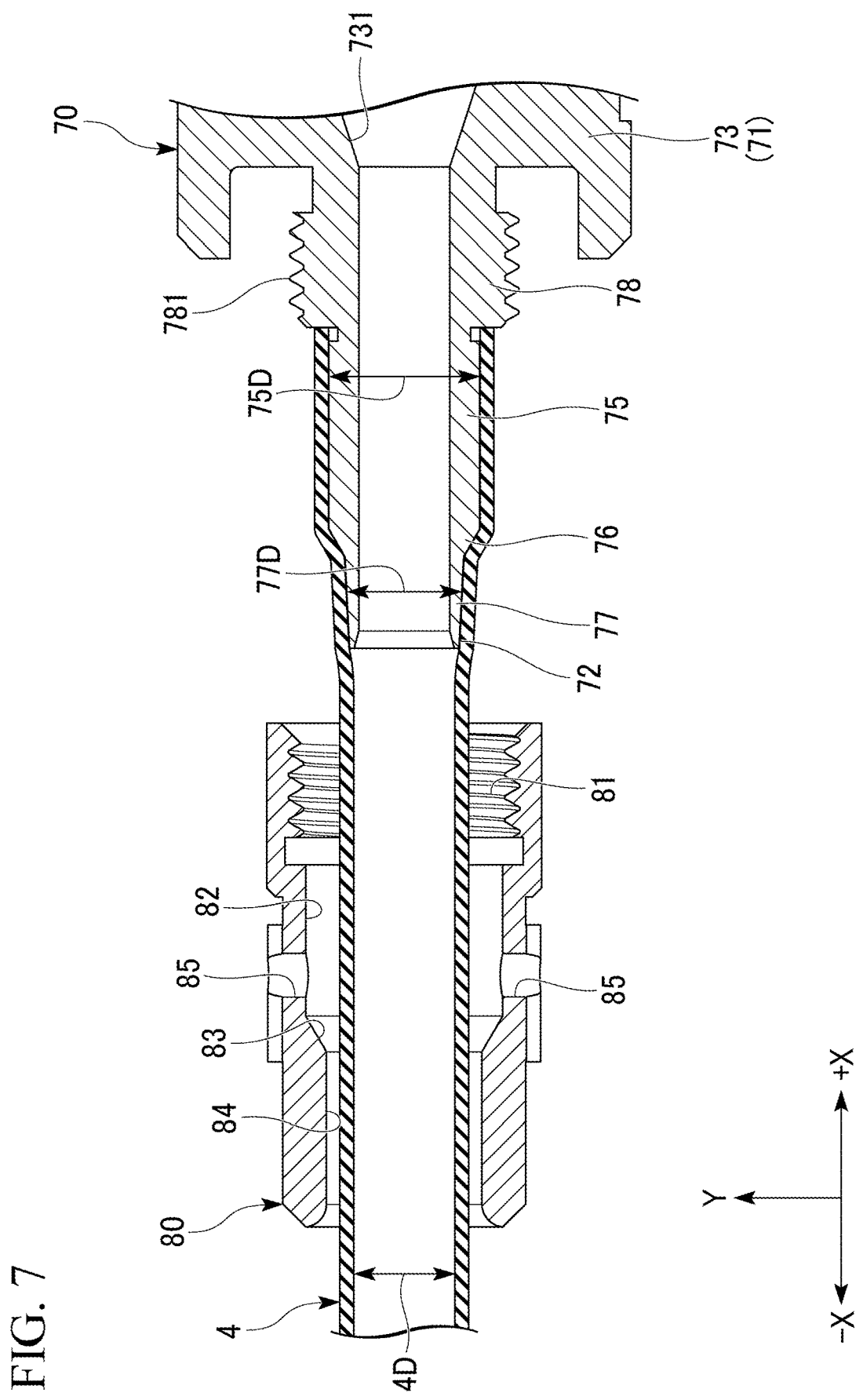
FIG. 7 is a cross-sectional view showing a state where the braided tube of FIG. 5 is mounted on the spring push.

As shown in FIGS. 2 and 3, the tube mounting part 72 is formed in a tubular shape which extends in the axial direction X and into which the optical fiber 2 is inserted. The tube mounting part 72 extends rearward from the rear end of the spring push main body 71 (the spring support portion 73) described above. The tube mounting part 72 is inserted inside the end portion (front end portion) of the braided tube 4 in the axial direction X from the rear end thereof, as shown in FIGS. 2 and 7. That is, the tube mounting part 72 is covered with the end portion of the braided tube 4. In such a manner, the end portion of the braided tube 4 is mounted on the spring push 70. As shown in FIGS. 4 and 5, the tube mounting part 72 has a first straight tubular section 75, a tapered tubular section 76, a second straight tubular section 77, and a male screw tubular section 78.

As shown in FIG. 5, an outer diameter dimension 75D of the first straight tubular section 75 is constant in the axial direction X. The outer diameter dimension 75D of the first straight tubular section 75 is larger than an inner diameter dimension 4D of the braided tube 4 in a state where an external force does not act thereon.

A length 75L of the first straight tubular section 75 in the axial direction X is equal to or larger than the mesh pitch 4P (refer to FIG. 9) of the braided tube 4. It is more preferable that the length 75L of the first straight tubular section 75 be equal to or larger than twice the mesh pitch 4P. In order to avoid an increase in the size of the optical connector 3 (particularly the length in the axial direction X), it is preferable that the length of the first straight tubular section 75 is less than or equal to three times the mesh pitch 4P, for example.

The tapered tubular section 76 extends rearward from the rear end of the first straight tubular section 75. The outer diameter dimension of the tapered tubular section 76 becomes smaller towards the rear side from the rear end of the first straight tubular section 75. That is, the outer peripheral surface of the tapered tubular section 76 is inclined with respect to the axial direction X. Therefore, the outer peripheral surface (tapered outer surface) of the tapered tubular section 76 faces not only the radially outer side of the tapered tubular section 76 but also the rear side (−X side).

The outer diameter dimension of the tapered tubular section 76 at the front end (the first straight tubular section 75 side) of the tapered tubular section 76 is equal to the outer diameter dimension 75D of the first straight tubular section 75. On the other hand, the outer diameter dimension of the tapered tubular section 76 at the rear end (the second straight tubular section 77 side) of the tapered tubular section 76 is smaller than the outer diameter dimension of the tapered tubular section 76 at the front end and is equal to an outer diameter dimension 77D of the second straight tubular section 77.

The second straight tubular section 77 extends rearward from the rear end of the tapered tubular section 76. The outer diameter dimension 77D of the second straight tubular section 77 is constant in the axial direction X and is smaller than the outer diameter dimension 75D of the first straight tubular section 75. The outer diameter dimension 77D of the second straight tubular section 77 may be, for example, the same as the inner diameter dimension 4D of the braided tube 4, or may be slightly smaller than the inner diameter dimension 4D of the braided tube 4. In one or more embodiments, the outer diameter dimension 77D of the second straight tubular section 77 is slightly larger than the inner diameter dimension 4D of the braided tube 4. As shown in FIG. 7, when the second straight tubular section 77 is inserted inside the braided tube 4, the portion of the braided tube 4 corresponding to the second straight tubular section 77 is slightly deformed. The diameter dimension of the portion of the braided tube 4 does not substantially change with respect to the diameter dimension in a state where an external force does not act on the braided tube 4.

Figure 6:
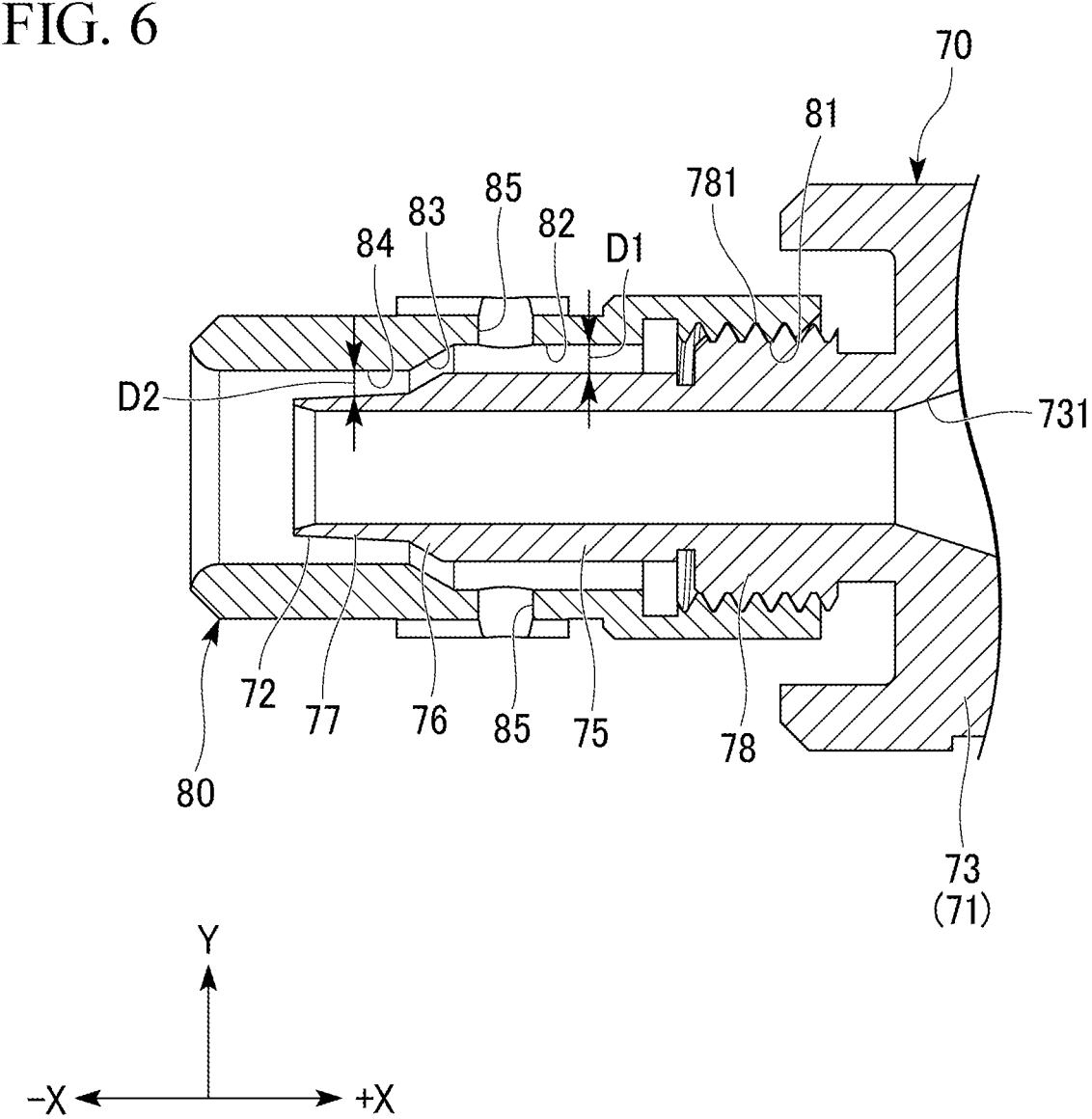
FIG. 6 is a cross-sectional view showing a state where the fixing member of FIG. 5 is locked to the spring push.

As shown in FIGS. 4 to 6, the male screw tubular section 78 is a portion for locking the fixing member 80 (described later) to the tube mounting part 72. The male screw tubular section 78 is provided in a row in front of the first straight tubular section 75. A male screw 781 is formed on the outer peripheral surface of the male screw tubular section 78. The outer diameter dimension of the male screw tubular section 78 is larger than the outer diameter dimension 75D of the first straight tubular section 75. The male screw tubular section 78, the first straight tubular section 75, the tapered tubular section 76, and the second straight tubular section 77 are arranged in such an order rearward from the rear end of the spring push main body 71 (the spring support portion 73). As shown in FIG. 7, the end portion of the braided tube 4 covers the first straight tubular section 75, the tapered tubular section 76, and the second straight tubular section 77, but does not cover the male screw tubular section 78.

The inner diameter dimension of the tube mounting part 72 that includes the male screw tubular section 78, the first straight tubular section 75, the tapered tubular section 76, and the second straight tubular section 77 described above is constant in the axial direction X. The inner diameter dimension of the tube mounting part 72 is set according to the thickness or the number of the optical fibers 2 to be inserted into the tube mounting part 72.

Figure 8:
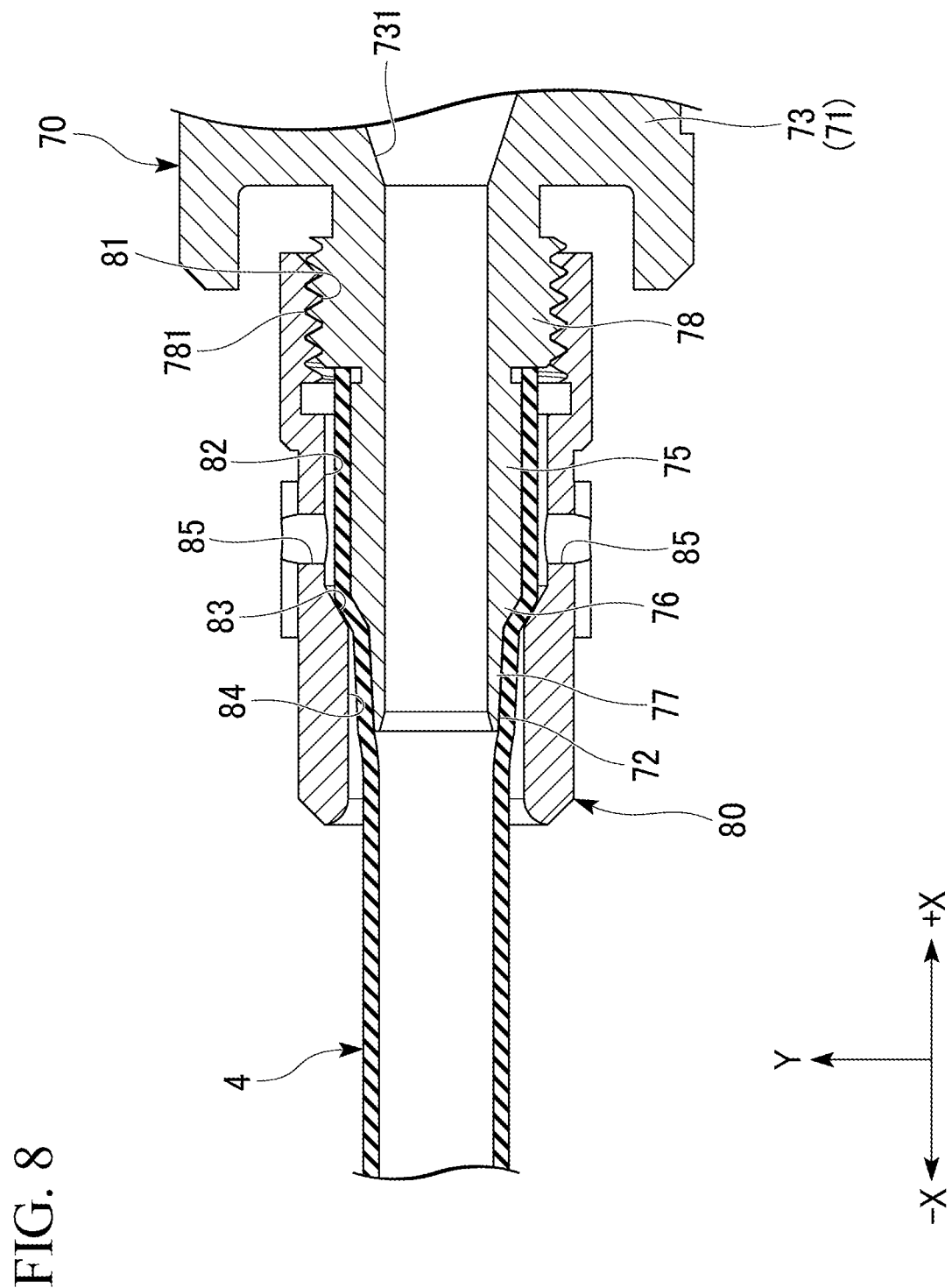
FIG. 8 is a cross-sectional view showing a state where the braided tube of FIG. 5 is fixed to the spring push by the fixing member.

As shown in FIGS. 2 and 8, the fixing member 80 fixes (temporarily fixes) the braided tube 4 mounted to the tube mounting part 72 of the spring push 70 to the tube mounting part 72. As shown in FIGS. 4 and 5, the fixing member 80 is formed in a tubular shape extending in the axial direction X. As shown in FIG. 8, the tube mounting part 72 and the end portion of the braided tube 4 mounted on the tube mounting part 72 are inserted inside the tubular fixing member 80 from behind the tube mounting part 72. The fixing member 80 is configured to be locked to the tube mounting part 72 in a state where the braided tube 4 is sandwiched between the outer peripheral surface of the tapered tubular section 76 and the inner peripheral surface of the fixing member 80 in the axial direction X.

Hereinafter, the fixing member 80 of one or more embodiments is specifically described.

As shown in FIGS. 5 and 6, a female screw 81 for locking the fixing member 80 to the tube mounting part 72 is formed on the inner peripheral surface of the fixing member 80. The female screw 81 engages with the male screw 781 of the tube mounting part 72. The female screw 81 is located at the front end portion of the fixing member 80. Further, the inner peripheral surface of the fixing member 80 includes a first straight inner surface 82, a tapered inner surface 83, and a second straight inner surface 84, which are arranged in such an order rearward from the rear end of the female screw 81.

The diameter dimension of the first straight inner surface 82 (the inner diameter dimension of the fixing member 80 on the first straight inner surface 82) is constant in the axial direction X. The first straight inner surface 82 faces the outer peripheral surface of the first straight tubular section 75 in the radial direction in a state where the fixing member is locked to the tube mounting part 72, as shown in FIG. 6. A gap is formed between the first straight inner surface 82 and the outer peripheral surface of the first straight tubular section 75 in a state where the fixing member 80 is locked to the tube mounting part 72.

An interval D1 (a first interval) between the first straight inner surface 82 and the outer peripheral surface of the first straight tubular section 75 in the radial direction may be the same as the diameter dimension of each of the fibers 4A and 4B (refer to FIG. 9) forming the braided tube 4, for example, or may be larger than the diameter dimension of each of the fibers 4A and 4B.

As shown in FIGS. 5 and 6, the diameter dimension of the tapered inner surface 83 (the inner diameter dimension of the fixing member 80 on the tapered inner surface 83) becomes smaller toward the rear side from the rear end of the first straight inner surface 82. That is, the tapered inner surface 83 is inclined with respect to the axial direction X. Therefore, the tapered inner surface 83 faces not only the radially inner side of the fixing member 80 but also the front side (+X side). The diameter dimension of the tapered inner surface 83 at the front end (the first straight inner surface 82 side) of the tapered inner surface 83 is equal to the diameter dimension of the first straight inner surface 82. On the other hand, the diameter dimension of the tapered inner surface 83 at the rear end (the second straight inner surface 84 side) of the tapered inner surface 83 is equal to the diameter dimension of the second straight inner surface 84.

The tapered inner surface 83 faces the outer peripheral surface of the tapered tubular section 76 in the radial direction and the axial direction X in a state where the fixing member 80 is locked to the tube mounting part 72, as shown in FIG. 6. In a state where the fixing member 80 is locked to the tube mounting part 72, the interval between the tapered inner surface 83 and the outer peripheral surface of the tapered tubular section 76 in the axial direction X is preferably smaller than the diameter dimension of each of the fibers 4A and 4B forming the braided tube 4. Further, in a state where the fixing member 80 is locked to the tube mounting part 72, for example, the tapered inner surface 83 and the outer peripheral surface of the tapered tubular section 76 may come into contact with each other. The inclination angles of the tapered inner surface 83 and the outer peripheral surface of the tapered tubular section 76 with respect to the axial direction X may be different from each other, for example. However, in one or more embodiments, the inclination angles are equal to each other.

As shown in FIG. 8, when the fixing member 80 is locked to the tube mounting part 72 in a state where the braided tube 4 covers the tube mounting part 72, the braided tube 4 is fixed to the tube mounting part 72. To be more specific, the braided tube 4 mounted on the tube mounting part 72 is sandwiched and fixed between the tapered inner surface 83 of the fixing member 80 and the outer peripheral surface of the tapered tubular section 76 in the axial direction X.

As shown in FIGS. 5 and 6, the diameter dimension of the second straight inner surface 84 (the inner diameter dimension of the fixing member 80 on the second straight inner surface 84) is constant in the axial direction X. The second straight inner surface 84 faces the outer peripheral surface of the second straight tubular section 77 in the radial direction in a state where the fixing member 80 is locked to the tube mounting part 72, as shown in FIG. 6. A gap is formed between the second straight inner surface 84 and the outer peripheral surface of the second straight tubular section 77 in a state where the fixing member 80 is locked to the tube mounting part 72.

An interval D2 (a second interval) between the second straight inner surface 84 and the outer peripheral surface of the second straight tubular section 77 in the radial direction is equal to or larger than the interval D1 between the first straight inner surface 82 and the outer peripheral surface of the first straight tubular section 75 in the radial direction. It is preferable that the interval D2 between the second straight inner surface 84 and the outer peripheral surface of the second straight tubular section 77 is equal to or larger than twice the diameter dimension of each of the fibers 4A and 4B forming the braided tube 4.

In order to set the interval D2 between the second straight inner surface 84 and the outer peripheral surface of the second straight tubular section 77 to be large, it is necessary to make the outer diameter dimension 77D of the second straight tubular section 77 smaller. However, if the thickness of the wall portion of the second straight tubular section 77 is excessively reduced when making the outer diameter dimension 77D of the second straight tubular section 77 smaller, the strength of the second straight tubular section 77 decreases. Therefore, it is preferable that the interval D2 between the second straight inner surface 84 and the outer peripheral surface of the second straight tubular section 77 is set to such an extent that the strength of the second straight tubular section 77 can be secured. For example, it is preferable that the interval D2 between the second straight inner surface 84 and the outer peripheral surface of the second straight tubular section 77 is less than three times the diameter dimension of each of the fibers 4A and 4B forming the braided tube 4.

As shown in FIGS. 4 and 5, the fixing member 80 of one or more embodiments further has an observation window 85 penetrating the fixing member 80 in the radial direction. The observation window 85 is formed at the portion of the fixing member 80 corresponding to the first straight inner surface 82 in the axial direction X. In such a manner, in a state where the fixing member 80 is locked to the tube mounting part 72, as shown in FIG. 6, the observation window 85 is disposed at a position corresponding to the outer peripheral surface of the first straight tubular section 75 in the axial direction X. Therefore, in a state where the fixing member 80 is locked to the tube mounting part 72, it is possible to visually recognize the outer peripheral surface of the first straight tubular section 75 through the observation window 85 from the outside of the fixing member 80.

In one or more embodiments, a plurality of observation windows 85 are disposed at intervals in the circumferential direction of the fixing member 80. A knurling portion is formed on the outer peripheral surface of the fixing member 80. The knurling portion prevents slipping when a worker rotates the fixing member 80. The end portion on the outside in the radial direction of the observation window 85 is open at the knurling portion. However, the knurling portion does not need to be formed in the fixing member 80.

As shown in FIGS. 2 and 3, the boot 90 is formed in a tubular shape extending in the axial direction X. The tube mounting part 72 and the fixing member 80 locked to the tube mounting part 72 are inserted inside the boot 90 from behind the fixing member 80. Further, the optical fiber 2 and the braided tube 4 extending to the rear of the tube mounting part 72 and the fixing member 80 are inserted inside the boot 90. The boot 90 protects the tube mounting part 72 and the fixing member 80 inserted into the boot 90. The boot 90 prevents the fixing member 80 from unexpectedly rotating with respect to the tube mounting part 72 to release (loosen) the locking state of the fixing member 80 to the tube mounting part 72.

An example of a method for fixing the braided tube 4 to the spring push 70 in the end part structure for an optical connector 1 of one or more embodiments is described mainly with reference to FIGS. 7 and 8.

First, as shown in FIG. 7, the tube mounting part 72 of the spring push 70 is inserted inside the end portion of the braided tube 4. At such time, the braided tube 4 is such that the braided tube 4 covers the second straight tubular section 77, the tapered tubular section 76, and the first straight tubular section 75 in such an order from the rear side.

Here, although the outer diameter dimension 77D of the second straight tubular section 77 is larger than the inner diameter dimension 4D of the braided tube 4, the difference is small. Therefore, it is possible to easily insert the second straight tubular section 77 inside the braided tube 4. If the outer diameter dimension 77D of the second straight tubular section 77 is less than or equal to than the inner diameter dimension 4D of the braided tube 4, it is possible to more easily insert the second straight tubular section 77 into the braided tube 4.

Further, the tapered tubular section 76 and the first straight tubular section 75 are arranged in such an order in front of the second straight tubular section 77. Therefore, even if the outer diameter dimension 75D of the first straight tubular section 75 is larger than the inner diameter dimension 4D of the braided tube 4, it is possible to easily insert the first straight tubular section 75 inside the end portion of the braided tube 4 due to the tapered tubular section 76. More specifically, the inner diameter of the braided tube 4 is widened along the outer peripheral surface of the tapered tubular section 76 by moving the braided tube 4 forward.

In a state where the first straight tubular section 75 is inserted inside the end portion of the braided tube 4, the braided tube 4 is elastically deformed such that the diameter dimension of the portion of the braided tube 4 corresponding to the first straight tubular section 75 becomes larger. That is, the end portion of the braided tube 4 is held (temporarily fixed) on the outer peripheral surface of the first straight tubular section 75 due to the elastic force of the braided tube 4. Further, in such a state, since the mesh 4C (refer to FIG.

8) of the braided tube 4 spreads in the circumferential direction of the first straight tubular section 75, the density of the fibers 4A and 4B of the braided tube 4 on the outer peripheral surface of the first straight tubular section 75 becomes smaller than the density of the fibers 4A and 4B in a state where an external force does not act thereon.

Further, in a state where the tube mounting part 72 is inserted inside the end portion of the braided tube 4, the braided tube 4 is also disposed on the outer peripheral surface of the tapered tubular section 76.

After the tube mounting part 72 is inserted inside the end portion of the braided tube 4, as shown in FIG. 8, the tube mounting part 72 and the end portion of the braided tube 4 are inserted inside the fixing member 80 to lock the fixing member 80 to the tube mounting part 72. In one or more embodiments, the fixing member 80 is locked to the tube mounting part 72 by rotating the fixing member 80 with respect to the tube mounting part 72 to cause the female screw 81 of the fixing member 80 to mesh with the male screw 781 of the tube mounting part 72. The fixing member 80 moves forward with respect to the tube mounting part 72 by rotating the fixing member 80 in a state where the female screw 81 engages with the male screw 781. Therefore, a portion of the braided tube 4 is sandwiched between the tapered inner surface 83 of the fixing member 80 and the outer peripheral surface of the tapered tubular section 76 in the axial direction X. In such a manner, the braided tube 4 is fixed to the tube mounting part 72 of the spring push 70.

As described above, in the end part structure for an optical connector 1 of one or more embodiments, the braided tube 4 mounted on the tube mounting part 72 is sandwiched between the outer peripheral surface of the tapered tubular section 76 of the tube mounting part 72 and the tapered inner surface 83 of the fixing member 80 in the axial direction X by locking the fixing member 80 to the tube mounting part 72. In such a manner, the braided tube 4 can be stably fixed to the tube mounting part 72 (the end portion of the optical connector 3).

Further, in one or more embodiments, the outer diameter dimension 75D of the first straight tubular section 75 of the tube mounting part 72 is larger than the inner diameter dimension 4D of the braided tube 4 in a state where an external force does not act thereon. Therefore, in a state where the end portion of the braided tube 4 is such that the end portion 4 is covered on the first straight tubular section 75, the braided tube 4 is elastically deformed such that the diameter dimension of the braided tube 4 is made to be larger. Here, the length 75L of the first straight tubular section 75 is equal to or larger than the mesh pitch 4P of the braided tube 4, so that it is possible to stably hold (temporarily fix) the braided tube 4 by the first straight tubular section 75 due to the elastic force of the braided tube 4. Further, if the length 75L of the first straight tubular section 75 is equal to or larger than twice the mesh pitch 4P of the braided tube 4, it is possible to stably hold the braided tube 4 by the first straight tubular section 75. Therefore, after the end portion of the braided tube 4 is such that the end portion of the braided tube 4 covers the first straight tubular section 75 and until the braided tube 4 is sandwiched between the outer peripheral surface of the tapered tubular section 76 and the tapered inner surface 83 of the fixing member 80, it is possible to suppress the end portion of the braided tube 4 from coming off from the tube mounting part 72.

Further, in one or more embodiments, a gap is formed between the outer peripheral surface of the second straight tubular section 77 and the second straight inner surface 84 (the inner peripheral surface) of the fixing member 80 in a state where the fixing member 80 is locked to the tube mounting part 72. In such a manner, it is possible to suppress the braided tube 4 from being caught between the outer peripheral surface of the second straight tubular section 77 and the second straight inner surface 84. In particular, by setting the interval D2 between the outer peripheral surface of the second straight tubular section 77 and the second straight inner surface 84 to be greater than or equal to twice the diameter dimension of each of the fibers 4A and 4B of the braided tube 4, it is possible to more reliably prevent the braided tube 4 from being caught between the outer peripheral surface of the second straight tubular section 77 and the second straight inner surface 84. Therefore, even if the fixing member 80 is rotated with respect to the tube mounting part 72 when the fixing member 80 is locked to the tube mounting part 72 by the screws (the male screw 781 and the female screw 81), it is possible to suppress the braided tube 4 from rotating together with the fixing member 80 to twist the braided tube 4.

Further, in one or more embodiments, a gap is formed between the outer peripheral surface of the first straight tubular section 75 and the first straight inner surface 82 (the inner peripheral surface) of the fixing member 80 in a state where the fixing member 80 is locked to the tube mounting part 72. In such a manner, the braided tube 4 can be suppressed from being caught between the outer peripheral surface of the first straight tubular section 75 and the first straight inner surface 82. Therefore, even if the fixing member 80 is rotated with respect to the tube mounting part 72 when the fixing member 80 is locked to the tube mounting part 72 by the screws (the male screw 781 of the tube mounting part 72 and the female screw 81 of the fixing member 80), it is possible to suppress the braided tube 4 from rotating together with the fixing member 80 to twist the braided tube 4.

It is preferable that the interval D1 between the outer peripheral surface of the first straight tubular section 75 and the first straight inner surface 82 is smaller than the interval D2 between the outer peripheral surface of the second straight tubular section 77 and the second straight inner surface 84. For example, the interval D1 may be the same as the diameter dimension of each of the fibers 4A and 4B of the braided tube 4. In these cases, even if the braided tube 4 is caught between the outer peripheral surface of the first straight tubular section 75 and the first straight inner surface 82, it is possible to suppress the braided tube 4 from rotating together with the fixing member 80.

In describing the above, the braided tube 4 that covers the first straight tubular section 75 is elastically deformed such that the diameter dimension thereof becomes larger, and as a result, the density of the fibers 4A and 4B of the braided tube 4 on the outer peripheral surface of the first straight tubular section 75 decreases. In such a manner, even if the braided tube 4 is caught between the first straight tubular section 75 and the fixing member 80, friction between the fixing member 80 and the braided tube 4 due to the rotation of the fixing member 80 is reduced compared to before the diameter dimension of the braided tube 4 becomes larger. Therefore, it is possible to suppress the braided tube 4 from rotating with the rotation of the fixing member 80.

Further, the fixing member 80 of one or more embodiments is formed with the observation window 85 through which it is possible to easily visually recognize the outer peripheral surface of the first straight tubular section 75 from the outside of the fixing member 80 in a state where the fixing member 80 is locked to the tube mounting part 72. In such a manner, whether or not it is possible to easily determine whether the braided tube 4 is fixed to the tube mounting part 72 using the observation window 85.

Specifically, in a case where it is possible to visually recognized through the observation window 85 that the braided tube 4 is present on the outer peripheral surface of the first straight tubular section 75 in a state where the fixing member 80 is locked to the tube mounting part 72, it is possible to determine that the braided tube 4 is sandwiched between the outer peripheral surface of the tapered tubular section 76 and the tapered inner surface 83 of the fixing member 80, that is, the braided tube 4 is fixed to the tube mounting part 72. On the other hand, in a case where it is not possible to visually recognize through the observation window 85 that the braided tube 4 is present on the outer peripheral surface of the first straight tubular section 75 in a state where the fixing member 80 is locked to the tube mounting part 72, it is possible to determine that the braided tube 4 is not sandwiched between the outer peripheral surface of the tapered tubular section 76 and the tapered inner surface 83 of the fixing member 80, that is, the braided tube 4 is not fixed to the tube mounting part 72.

Further, according to one or more embodiments, the male screw 781 is formed on the tube mounting part 72, and the female screw 81 that engages with the male screw 781 is formed on the fixing member 80. In such a manner, it is possible to easily lock the fixing member 80 to the tube mounting part 72 by causing the female screw 81 of the fixing member 80 to mesh with the male screw 781 of the tube mounting part 72. Further, by rotating the fixing member 80 with respect to the tube mounting part 72 in a state where the female screw 81 of the fixing member 80 engages with the male screw 781 of the tube mounting part 72, it is possible to bring the tapered inner surface 83 of the fixing member 80 close to the outer peripheral surface of the tapered tubular section 76 in the axial direction X. That is, it is possible to easily sandwich the braided tube 4 between the outer peripheral surface of the tapered tubular section 76 and the inner peripheral surface of the fixing member 80 by simply rotating the fixing member 80 with respect to the tube mounting part 72. Further, the force by which the worker rotates the fixing member 80 is amplified by the engagement of the female screw 81 with the male screw 781 and becomes the driving force of the fixing member 80. Therefore, the force in the axial direction X of causing the braided tube 4 to be sandwiched between the tapered inner surface 83 and the tapered tubular section 76 becomes larger, so that it is possible to more stably fix the braided tube 4.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the outer diameter dimension 75D of the first straight tubular section 75 may be less than or equal to the inner diameter dimension 4D of the braided tube 4 in a state where an external force does not act thereon. Even in such a case, the braided tube 4 mounted on the tube mounting part 72 can be sandwiched between the outer peripheral surface of the tapered tubular section 76 of the tube mounting part 72 and the inner peripheral surface of the fixing member 80 in the axial direction X.

Further, the structure for locking the fixing member 80 to the tube mounting part 72 is not limited to a threaded structure (the male screw 781 and the female screw 81), and for example, the structure may be composed of a claw formed on the inner periphery of the fixing member 80 and a recess portion which is formed on the outer periphery of the tube mounting part 72 and in which the claw of the fixing member 80 is inserted and catches on to.

Further, the component (the male screw tubular section 78) in which the male screw 781 is formed and the component (the fixing member 80) in which the female screw 81 is formed may have different moduli of elasticity, for example, by being made of materials having varying glass content amounts, or the like. In such a case, it is possible to suppress or prevent loosening of the screws (loosening of the engagement of the male screw 781 with the female screw 81) due to external factors such as vibration.

Further, it is possible to appropriately replace the configuring components in the above-described embodiments with well-known configuring components, and the above-described embodiments and modification examples may be appropriately combined.

REFERENCE SIGNS LIST

1: End Part Structure for Optical Connector
2: Optical Fiber
3: Optical Connector
4: Braided Tube
4D: Inner Diameter Dimension of Braided Tube 4
4P: Mesh Pitch
10: Ferrule
14: Connection End Face
20: Housing
60: Spring
70: Spring Push
72: Tube Mounting Part
75: First Straight Tubular Section
75D: Outer Diameter Dimension of First Straight Tubular Section 75
75L: Length of First Straight Tubular Section 75
76: Tapered Tubular Section
77: Second Straight Tubular Section
77D: Outer Diameter Dimension of Second Straight Tubular Section 77
78: Male Screw Tubular Section
781: Male Screw
80: Fixing Member
81: Female Screw
85: Observation Window
D1: First Interval
D2: Second Interval
X: Axial Direction (Longitudinal Direction of Fiber Hole)

The invention claimed is:

1. An end part structure for an optical connector, comprising:
a ferrule having a connection end face and a fiber hole into which an optical fiber is inserted up to the connection end face;
a spring disposed at a rear side of the ferrule in a longitudinal direction of the fiber hole, where a side on which the connection end face is disposed is defined as a front side and an opposite side of the front side is defined as the rear side;
a spring push that surrounds the optical fiber, wherein the spring is sandwiched between the spring push and the ferrule in the longitudinal direction;
a housing that accommodates the ferrule and the spring, and to which the spring push is locked such that the ferrule is biased forward by the spring;
a braided tube mounted on the spring push; and a fixing member that fixes the braided tube to the spring push, wherein the spring push has a tube mounting part inserted in the braided tube and having a tubular shape extending in the longitudinal direction, the tube mounting part has:
- a first straight tubular section having an outer diameter dimension constant in the longitudinal direction, and
- a tapered tubular section disposed at the rear side of the first straight tubular section and having an outer diameter dimension that becomes smaller toward the rear side, the fixing member having a tubular shape in which the tube mounting part is inserted from the rear side of the tube mounting part, an end portion of the braided tube mounted on the tube mounting part is disposed in the fixing member, the fixing member is locked to the tube mounting part when the braided tube is sandwiched between an outer peripheral surface of the tapered tubular section and an inner peripheral surface of the fixing member in the longitudinal direction, and a length of the first straight tubular section is equal to or larger than a mesh pitch of the braided tube.

2. The end part structure according to claim 1, wherein the length of the first straight tubular section is equal to or larger than twice the mesh pitch.

3. The end part structure according to claim 1, wherein the outer diameter dimension of the first straight tubular section is larger than an inner diameter dimension of the braided tube.

4. The end part structure according to claim 1, wherein
the tube mounting part has a second straight tubular section extending rearward from the tapered tubular section, an outer diameter dimension of the second straight tubular section is constant in the longitudinal direction and is smaller than the outer diameter dimension of the first straight tubular section, and a gap is between an outer peripheral surface of the second straight tubular section and the inner peripheral surface of the fixing member when the fixing member is locked to the tube mounting part.

5. The end part structure according to claim 4, wherein a gap is between an outer peripheral surface of the first straight tubular section and the inner peripheral surface of the fixing member when the fixing member is locked to the tube mounting part.

6. The end part structure according to claim 5, wherein a first interval between the outer peripheral surface of the first straight tubular section and the inner peripheral surface of the fixing member in a radial direction is less than or equal to a second interval between the outer peripheral surface of the second straight tubular section and the inner peripheral surface of the fixing member in the radial direction.

7. The end part structure according to claim 1, wherein
the fixing member has an observation window that penetrates the fixing member in a radial direction, and the observation window is disposed at a position corresponding to an outer peripheral surface of the first straight tubular section in the longitudinal direction when the fixing member is locked to the tube mounting part.

8. The end part structure according to claim 1, wherein
the tube mounting part includes a male screw tubular section disposed in front of the first straight tubular section and having a male screw on an outer peripheral surface thereof, and the inner peripheral surface of the fixing member has a female screw engaging with the male screw.

* * * * *